United States Patent
Norkus et al.

(10) Patent No.: US 6,314,633 B1
(45) Date of Patent: Nov. 13, 2001

(54) METHOD FOR MANUFACTURING A JOUNCE BUMPER ASSEMBLY

(75) Inventors: James F. Norkus; William J. Curley, Jr., both of Waterbury, CT (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/571,207

(22) Filed: May 16, 2000

Related U.S. Application Data

(62) Division of application No. 09/157,148, filed on Sep. 18, 1998, now Pat. No. 6,113,084.

(51) Int. Cl.$^7$ .................................................. B23P 11/02
(52) U.S. Cl. ............................ 29/448; 29/445; 29/897.2; 29/512
(58) Field of Search .................. 29/897.2, 445, 29/446, 448, 511, 512, 527.1; 264/274, 279; 267/153, 141–141.7, 292, 293, 294, 33, 140, 219, 220; 248/615, 616, 634, 356; 403/225–228; 293/136, 155

(56) References Cited

U.S. PATENT DOCUMENTS

| | | | |
|---|---|---|---|
| 3,643,320 | * | 2/1972 | Werner ................................. 29/897.2 |
| 3,694,895 | * | 10/1972 | Werner ................................. 29/897.2 |
| 3,809,427 | * | 5/1974 | Bennett ................................... 29/512 |
| 4,536,116 | * | 8/1985 | Murray ................................... 264/274 |
| 5,240,233 | * | 8/1993 | Kato et al. ............................ 29/897.2 |
| 5,397,112 | * | 3/1995 | Roth et al. ............................ 29/897.2 |
| 5,415,443 | * | 5/1995 | Hayashi ................................... 29/511 |
| 5,656,353 | * | 8/1997 | Butler .................................... 264/274 |
| 5,672,405 | * | 9/1997 | Plank, Jr. et al. ..................... 264/274 |
| 5,911,936 | * | 6/1999 | Hanazaki et al. ..................... 264/274 |
| 6,096,256 | * | 8/2000 | Aretz .................................... 264/274 |

FOREIGN PATENT DOCUMENTS

6159417 * 6/1994 (JP) .

* cited by examiner

*Primary Examiner*—S. Thomas Hughes
*Assistant Examiner*—T. Nguyen
(74) *Attorney, Agent, or Firm*—St. Onge Steward Johnston & Reens LLC

(57) ABSTRACT

A mounting plate is provided having at least one protuberance protruding from a face thereof. A bumper is molded around the mounting plate such that an end of the protuberance extends out from the bumper. A mounting cup is also provided having a recess sized and shaped to correspond with the periphery of the lower portion of the bumper, the recess having at least one hole corresponding to the protuberance, and having a means for attaching the jounce bumper assembly to a frame, which means is independent of the protuberance. The bumper is snugly received in the recess such that the end of the protuberance passes through the hole. Relative sliding between the bumper and the mounting cup is inhibited by the snug fit therebetween. The end of the protuberance is then deformed radially outwardly such that the bumper is fixed within the recess of the mounting cup.

8 Claims, 2 Drawing Sheets

METHOD FOR MANUFACTURING A JOUNCE BUMPER ASSEMBLY

CLAIM OF PRIORITY

This is a divisional of U.S. patent application Ser. No. 09/157,148, filed Sep. 18, 1998 now U.S. Pat. No. 6,113,084.

FIELD OF THE INVENTION

The present invention relates to an automotive suspension system, and more particularly to a jounce bumper assembly for cushioning the impact between two components of an automotive suspension system. In another aspect, the present invention relates to a method of manufacturing such a jounce bumper assembly.

BACKGROUND OF THE INVENTION

Jounce bumpers for use in motor vehicle suspension systems are well known. Such devices have long been used for cushioning the impact between two suspension system components, such as the axle and a portion of the frame. To this end the jounce bumper, which includes a resilient material, is attached to the suspension system at a point where impact is likely to occur when the shock absorber fails to absorb the forces created by extraordinary driving conditions. The jounce bumper serves to cushion the impact, thereby reducing noise, the feel of the impact by the driver, and possible damage to the suspension system. However, although such devices are known, certain deficiencies in the prior art exist.

Referring to FIG. 1, an example of a prior art jounce bumper assembly is shown. The jounce bumper assembly 100 comprises a mounting cup 102 sized and shaped to receive a resilient bumper 104. A plurality of stamped fingers 106 in the side waits 108 of mounting cup 102 are pressed into bumper 104 to retain bumper 104 in mounting cup 102. A disadvantage of such a design is that side walls 108 of mounting cup 102 must have a depth great enough to provide fingers 106 of a sufficient length to retain bumper 104 in mounting cup 102. There may not, however, be enough space available between the suspension system components to allow for the use of such a deep mounting cup. Another disadvantage of this prior art design is the stresses on jounce bumper assembly 100 caused by repeated impacts may cause bumper 104 to deform and eventually pull out of mounting cup 102. This is particularly true when the depth of mounting cup 102 is shallow relative to its width.

What is desired, therefore, is a jounce bumper assembly for cushioning the impact between two components of an automotive suspension system, which can be disposed between suspension system components even when little space is provided therebetween, and which can withstand the stresses associated with repeated impacts.

SUMMARY OF THE INVENTION

Accordingly, it is an object of the present invention to provide a jounce bumper assembly which cushions the impact between two components of an automotive suspension system.

Another object of the present invention to provide a jounce bumper assembly having the above characteristics and which can be disposed between suspension system components even when little space is provided therebetween.

A further object of the present invention is to provide a jounce bumper assembly having the above characteristics and which can withstand the stresses associated with repeated impacts.

These and other objects of the present invention are achieved by provision of a jounce bumper assembly having a mounting plate with at least one, but preferably two, substantially tubular proturbances protruding from a face thereof. A bumper is molded from a microcellular polymeric material around the mounting plate such that the ends of the proturbances extend out from the bumper. The bumper is disposed within a mounting cup having a recess sized and shaped to receive the bumper. The recess has holes passing therethrough corresponding to the proturbances such that the ends of the proturbances pass through the holes. The ends of the proturbances passing through the holes are deformed radially outwardly such that the bumper is fixed within the recess of the mounting cup.

Preferably the mounting plate has a plurality of holes passing therethrough, which aid in molding the bumper therearound and which act to strengthen the attachment between the bumper and the mounting plate. The mounting plate also preferably has a plurality of protrusions on the face thereof, the plurality of protrusions being encased within the bumper to further strengthen the attachment. Also preferably, the microcellular polymeric material of which the bumper is formed is microcellular urethane. The preferred methods for deforming the ends of the proturbances radially outwardly are orbital spinning or cold staking.

The invention and its particular features and advantages will become more apparent from the following detailed description considered with reference to the accompanying drawings.

DETAILED DESCRIPTION OF THE INVENTION

Figure 1:
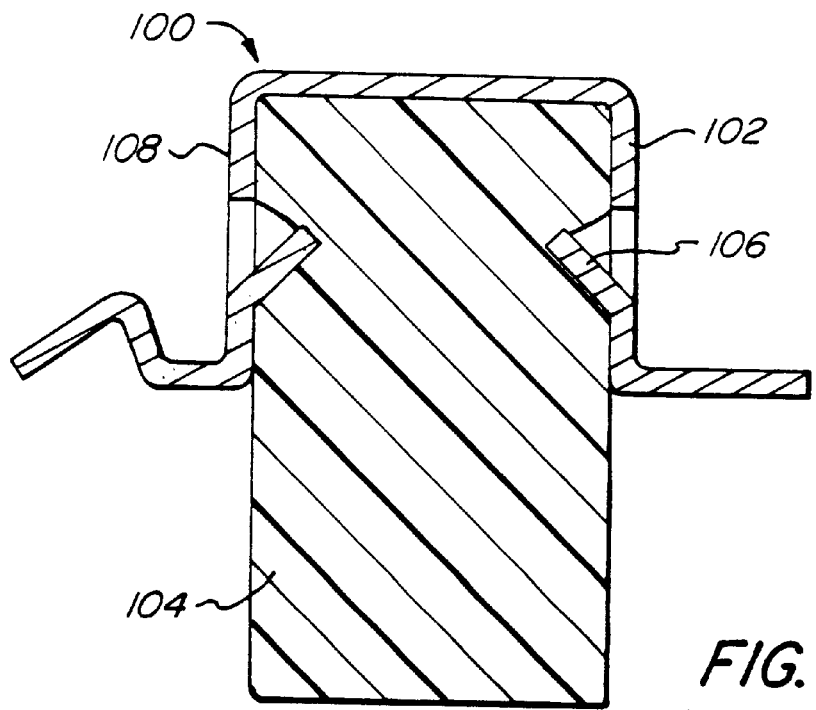
FIG. 1 is a partially cross-sectional view of a prior art jounce bumper assembly.

Referring now to FIGS. 2 through 5, a jounce bumper assembly 10 in accordance with the present invention is shown. The jounce bumper assembly 10 includes a mounting plate 12 with at least one, but preferably two, proturbances 14 extending from a face 16 thereof. A bumper 18 is molded around mounting plate 12 such that the ends 20 of proturbances 14 extend out from bumper 18 (best seen in FIG. 2). Bumper 18 is disposed within a mounting cup 22 having a recess 24 sized and shaped to receive bumper 18. Recess 24 has at least one, but preferably two, holes 26 passing therethrough corresponding to proturbances 14 such that ends 20 of proturbances 14 pass through holes 26 (shown in FIG. 5). Ends 20 of proturbances 14 passing through holes 26 are deformed radially outwardly such that bumper 18 is fixed within recess 24 of mounting cup 22 (also shown in FIG. 5).

Figure 2:
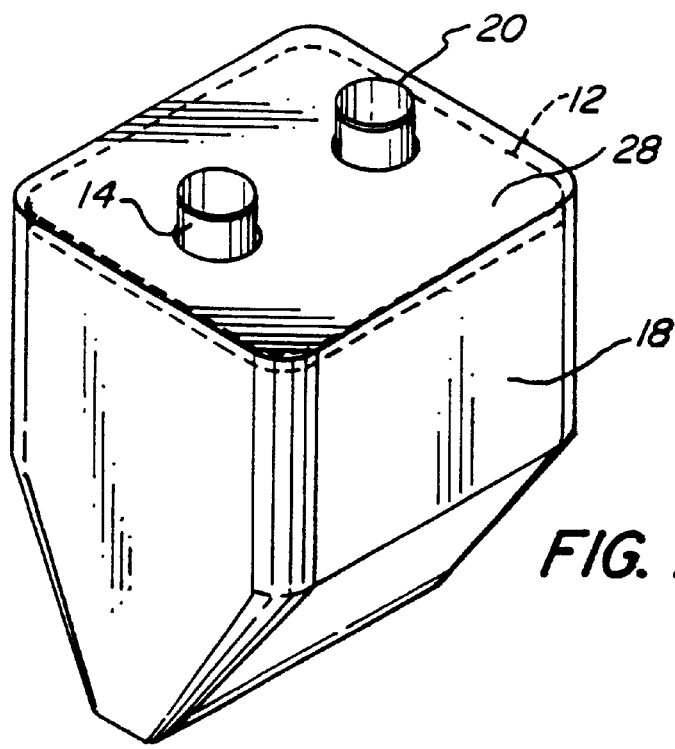
FIG. 2 is an isometric view of a portion of a jounce bumper assembly in accordance with the present invention, with a portion thereof shown in phantom.
Figure 3:
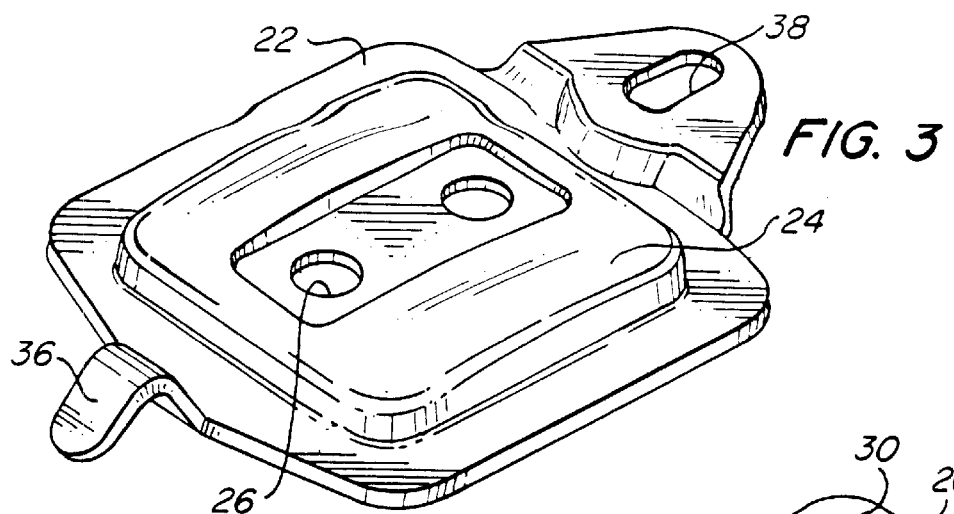
FIG. 3 is an isometric view of another portion of a jounce bumper assembly in accordance with the present invention.
Figure 4:
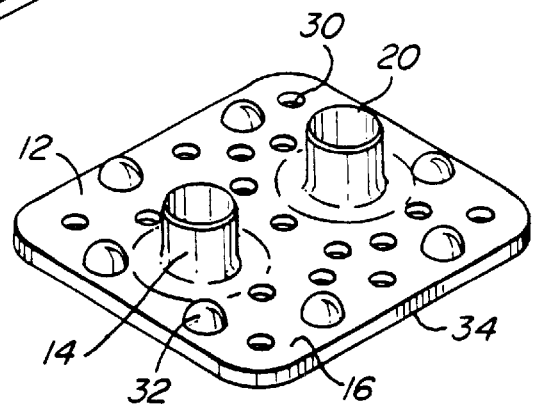
FIG. 4 is an isometric view of another portion of a jounce bumper assembly in accordance with the present invention.
Figure 5:
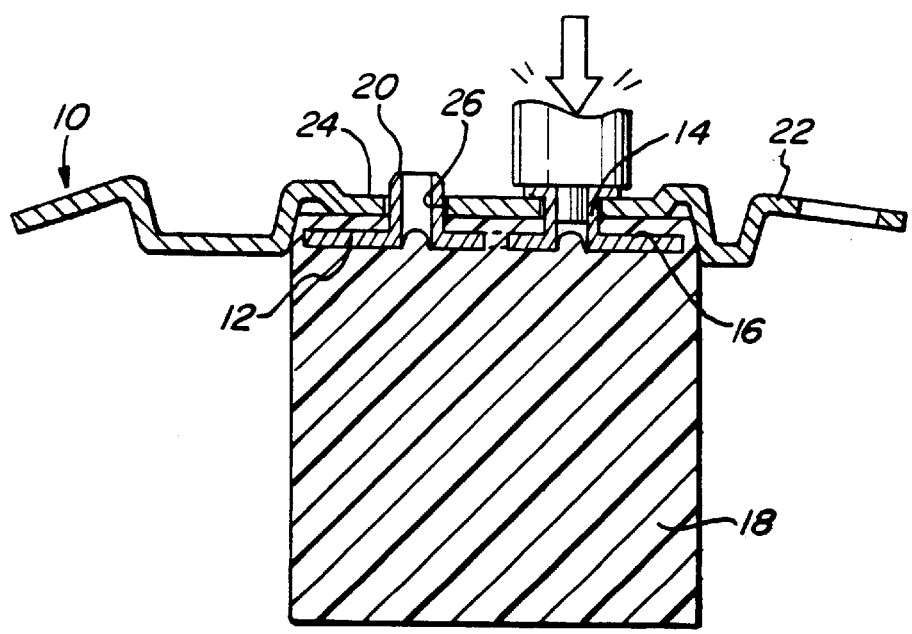
FIG. 5 is a partially cross-sectional view of a jounce bumper assembly in accordance with the present invention illustrating portions thereof being joined together.

Bumper 18 is preferably molded from a microcellular polymeric material, with microcellular urethane being most preferred. Such a microcellular urethane material is commonly known and is readily available under the name MCU from the Freudenberg-NOK Company. It is contemplated that bumper 18 may have any of numerous shapes, although a preferred configuration is illustrated in the Figures. In this preferred configuration, the base 28 of bumper 18 has a cross-section which is substantially rectangular with rounded corners, as is best seen in FIG. 2.

Mounting plate 12 has a shape substantially the same as the shape of base 28 of bumper 18, but with smaller dimensions. Thus, when bumper 18 is molded around mounting plate 12, mounting plate 12 is substantially fully encased within bumper 18, except for proturbances 14 (best seen in FIG. 2). Preferably, proturbances 14 are extruded from mounting plate 12 and have a substantially tubular configuration. Mounting plate 12 preferably has a plurality of holes 30 passing therethrough. Holes 30 act to facilitate the flow of material around mounting plate 12 during molding and act to strengthen the attachment between mounting plate 12 and bumper 18 by allowing the molding material on either side of mounting plate 12 to form a plurality of fingers therethrough. These fingers inhibit relative movement between mounting plate 12 and bumper 18 even under the high shear stresses associated with repeated impacts. Similarly, mounting plate 12 preferably includes a plurality of protrusions 32 on face 16. These protrusions 32 are preferably formed by punch stamping the face 34 of mounting plate 12 opposite face 16. Thus, each protrusion 32 on face 16 has a corresponding recess (not shown) in face 34. Protrusions 32 and their corresponding recesses act to further strengthen the attachment between mounting plate 12 and bumper 18, as during molding the material used to form bumper 18 encases protrusions 32 and fills their corresponding recesses, which arrangement further inhibits relative movement between mounting plate 12 and bumper 18.

Mounting cup 22 is preferably stamped from a sheet of metallic material. Recess 24, which is stamped in mounting cup 22 is sized and shaped to receive bumper 18 with mounting plate 12 embedded therein. Preferably bumper 18 fits snugly into recess 24. Holes 26 are sized, shaped and located to receive proturbances 14 when bumper 18 is disposed in recess 24. Proturbances 14 pass through holes 26, and the ends 20 thereof are widened to a dimension greater than the dimension of holes 26 so that proturbances 14 hold bumper 18 within recess 24. In the preferred embodiment, when proturbances 14 have a substantially tubular configuration, ends 20 of proturbances 14 are deformed radially outwardly, preferably by either orbital spinning or cold staking, to accomplish the attachment of bumper 18 to mounting cup 22 (illustrated in FIG. 5). By using this attachment means, recess 24 in mounting cup 22 need only be deep enough to inhibit relative sliding between bumper 18 and mounting cup 22, and is on the order of a fraction of an inch.

Jounce bumper assembly 10 is attached to a component of the automotive suspension system at a point where impact is likely to occur. For example, where impact is anticipated between the frame of the vehicle and the axle, jounce bumper assembly 10 may be attached to the frame. This attachment may be accomplished, for example, by providing mounting cup 22 with a tongue 36 and a hole 38. To mount jounce bumper assembly 10 to the frame, tongue 36 would be inserted in a slot (not shown) provided in the vehicle frame and a bolt would be passed through hole 38. Hole 38 may be slotted to allow for some dimensional variances.

The present invention, therefore, provides a jounce bumper assembly for cushioning the impact between two components of an automotive suspension system, which can be disposed between suspension system components even when little space is provided therebetween, and which can withstand the stresses associated with repeated impacts.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of manufacturing a jounce bumper assembly comprising the steps of:

providing a mounting plate having at least one substantially tubular protuberance protruding from a face thereof;

molding a bumper around the mounting plate such that an end of the at least one substantially tubular protuberance extends out from the bumper and such that the bumper has a lower portion having a periphery;

providing a mounting cup having a recess sized and shaped to correspond with the periphery of the lower portion of the bumper, the recess having at least one hole corresponding to the at least one substantially tubular protuberance;

snugly receiving the bumper in the recess such that the end of the at least one substantially tubular protuberance passes through the at least one hole; inhibiting relative sliding between the bumper and the mounting cup by the snug fit of the bumper in the recess;

deforming the end of the at least one substantially tubular protuberance passing through the hole radially outwardly such that the bumper is fixed within the recess of the mounting cup; and providing the mounting cup with a means for attaching the jounce bumper assembly to a frame, which means is independent of the at least one protuberance.

2. The method of manufacturing a jounce bumper assembly of claim 1, further comprising, before said molding step, the step of creating a plurality of holes in the mounting plate.

3. The method of manufacturing a jounce bumper assembly of claim 1 further comprising, before said molding step, the step of creating a plurality of protrusions on the face of the mounting plate, and wherein said molding step comprises molding a bumper around the mounting plate such that an end of the at least one substantially tubular protuberance extends out from the bumper and such that the bumper encases the plurality of protrusions.

4. The method of manufacturing a jounce bumper assembly of claim 1 wherein said deforming step comprises orbital spinning the end of the at least one substantially tubular protuberance passing through the hole radially outwardly such that the bumper is fixed within the recess of the mounting cup.

5. The method of manufacturing a jounce bumper assembly of claim 1 wherein said deforming step comprises cold staking the end of the at least one substantially tubular protuberance passing through the hole radially outwardly such that the bumper is fixed within the recess of the mounting cup.

6. A method of manufacturing a jounce bumper assembly comprising the steps of:

providing a mounting plate having at least one substantially tubular protuberance protruding from a face thereof;

creating a plurality of holes in the mounting plate;

creating a plurality of protrusions on the face of the mounting plate;

molding a bumper around the mounting plate such that an end of the at least one substantially tubular protuberance extends out from the bumper and such that the bumper encases the plurality of protrusions, and such that the bumper has a lower portion having a periphery;

providing a mounting cup having a recess sized and shaped to correspond with the periphery of the lower portion of the bumper, the recess having at least one hole corresponding to the at least one substantially tubular protuberance;

snugly receiving the bumper in the recess such that the end of the at least one substantially tubular protuberance passes through the at least one hole; inhibiting relative sliding between the bumper and the mounting cup by the snug fit of the bumper in the recess;

deforming the end of the at least one substantially tubular protuberance passing through the hole radially outwardly such that the bumper is fixed within the recess of the mounting cup; and providing the mounting cup with a means for attaching the jounce bumper assembly to a frame, which means is independent of the at least one protuberance.

7. The method of manufacturing a jounce bumper assembly of claim 6 wherein said deforming step comprises orbital spinning the end of the at least one substantially tubular protuberance passing through the hole radially outwardly such that the bumper is fixed within the recess of the mounting cup.

8. The method of manufacturing a jounce bumper assembly of claim 6 wherein said deforming step comprises cold staking the end of the at least one substantially tubular protuberance passing through the hole radially outwardly such that the bumper is fixed within the recess of the mounting cup.

* * * * *